(12) United States Patent
Younkin

(10) Patent No.: US 6,260,513 B1
(45) Date of Patent: Jul. 17, 2001

(54) PET SAFETY HARNESS FOR A PICKUP TRUCK

(76) Inventor: James A. Younkin, 2245 West Dr., Butte, MT (US) 59701

( * ) Notice: Subject to any disclaimer, the term of this patent is extended or adjusted under 35 U.S.C. 154(b) by 0 days.

(21) Appl. No.: 09/534,481

(22) Filed: Mar. 24, 2000

(51) Int. Cl.[7] .............................. B60R 22/00; A01K 27/00
(52) U.S. Cl. ................................. 119/771; 119/796
(58) Field of Search .................................. 119/769, 771, 119/772, 792, 795, 796, 794, 863

(56) References Cited

U.S. PATENT DOCUMENTS

| D. 250,488 | 12/1978 | Wilmot | D30/44 |
|---|---|---|---|
| D. 343,032 | 1/1994 | Carrero | 119/771 |
| D. 360,711 | 7/1995 | O'neill | 119/771 |
| D. 379,688 | 6/1997 | Werner | D30/152 |
| 4,252,084 | * 2/1981 | Willow | 119/771 |
| 4,899,694 | * 2/1990 | Belluomini | 119/771 |
| 4,947,801 | 8/1990 | Glass | 119/771 |
| 5,718,190 | 2/1998 | Tinker | 119/771 |
| 5,816,198 | * 10/1998 | Peterson | 119/794 |
| 5,890,456 | * 4/1999 | Tancrede | 119/794 |
| 6,079,369 | * 6/2000 | Hill et al. | 119/771 |
| 6,101,979 | * 8/2000 | Wilson et al. | 119/771 |

* cited by examiner

*Primary Examiner*—Charles T. Jordan
*Assistant Examiner*—Elizabeth Shaw

(57) ABSTRACT

A pet safety harness for a pickup truck for safely securing a pet during transportation. The pet safety harness for a pickup truck includes a harness member having strap members interconnected with cross members and having buckle members attached thereto and a plurality of holes disposed along ends thereof; and also includes leash support members pivotally connected to the harness member and mounted to the box of the pickup truck; and further includes retractable leash members connected to the leash support members.

7 Claims, 2 Drawing Sheets

PET SAFETY HARNESS FOR A PICKUP TRUCK

BACKGROUND OF THE INVENTION

1. Field of the Invention

The present invention relates to a safety harness and more particularly pertains to a new pet safety harness for a pickup truck for safely securing a pet during transportation.

2. Description of the Prior Art

The use of a safety harness is known in the prior art. More specifically, a safety harness heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,718,190; U.S. Pat. No. Des. 379,688; U.S. Pat. No. Des. 360,711; U.S. Pat. No. Des. 343,032; U.S. Pat. No. 4,947,801; and U.S. Pat. No. Des. 250,488.

While these devices fulfill their respective, particular objectives and requirements, the aforementioned patents do not disclose a new pet safety harness for a pickup truck. The inventive device includes a harness member having strap members interconnected with cross members and having buckle members attached thereto and a plurality of holes disposed along ends thereof; and also includes leash support members pivotally connected to the harness member and mounted to the box of the pickup truck; and further includes retractable leash members connected to the leash support members.

In these respects, the pet safety harness for a pickup truck according to the present invention substantially departs from the conventional concepts and designs of the prior art, and in so doing provides an apparatus primarily developed for the purpose of safely securing a pet during transportation.

SUMMARY OF THE INVENTION

In view of the foregoing disadvantages inherent in the known types of safety harness now present in the prior art, the present invention provides a new pet safety harness for a pickup truck construction wherein the same can be utilized for safely securing a pet during transportation.

The general purpose of the present invention, which will be described subsequently in greater detail, is to provide a new pet safety harness for a pickup truck which has many of the advantages of the safety harness mentioned heretofore and many novel features that result in a new pet safety harness for a pickup truck which is not anticipated, rendered obvious, suggested, or even implied by any of the prior art safety harness, either alone or in any combination thereof.

To attain this, the present invention generally comprises a harness member having strap members interconnected with cross members and having buckle members attached thereto and a plurality of holes disposed along ends thereof; and also includes leash support members pivotally connected to the harness member and mounted to the box of the pickup truck; and further includes retractable leash members connected to the leash support members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet safety harness for a pickup truck which has many of the advantages of the safety harness mentioned heretofore and many novel features that result in a new pet safety harness for a pickup truck which is not anticipated, rendered obvious, suggested, or even implied by any of the prior art safety harness, either alone or in any combination thereof.

It is another object of the present invention to provide a new pet safety harness for a pickup truck which may be easily and efficiently manufactured and marketed.

It is a further object of the present invention to provide a new pet safety harness for a pickup truck which is of a durable and reliable construction.

An even further object of the present invention is to provide a new pet safety harness for a pickup truck which is susceptible of a low cost of manufacture with regard to both materials and labor, and which accordingly is then susceptible of low prices of sale to the consuming public, thereby making such pet safety harness for a pickup truck economically available to the buying public.

Still yet another object of the present invention is to provide new pet safety harness for a pickup truck which provides in the apparatuses and methods of the prior art some of the advantages thereof, while simultaneously overcoming some of the disadvantages normally associated therewith.

Still another object of the present invention is to provide a new pet safety harness for a pickup truck for safely securing a pet during transportation.

Yet another object of the present invention is to provide a new pet safety harness for a pickup truck which includes a harness member having strap members interconnected with cross members and having buckle members attached thereto and a plurality of holes disposed along ends thereof; and also includes leash support members pivotally connected to the harness member and mounted to the box of the pickup truck; and further includes retractable leash members connected to the leash support members.

Still yet another object of the present invention is to provide a new pet safety harness for a pickup truck that conveniently and securely safeguards a pet such as a dog in the box of a pickup truck.

Even still another object of the present invention is to provide a new pet safety harness for a pickup truck that allows the pet to move about the box of the pickup truck without getting tangled up with the leash members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
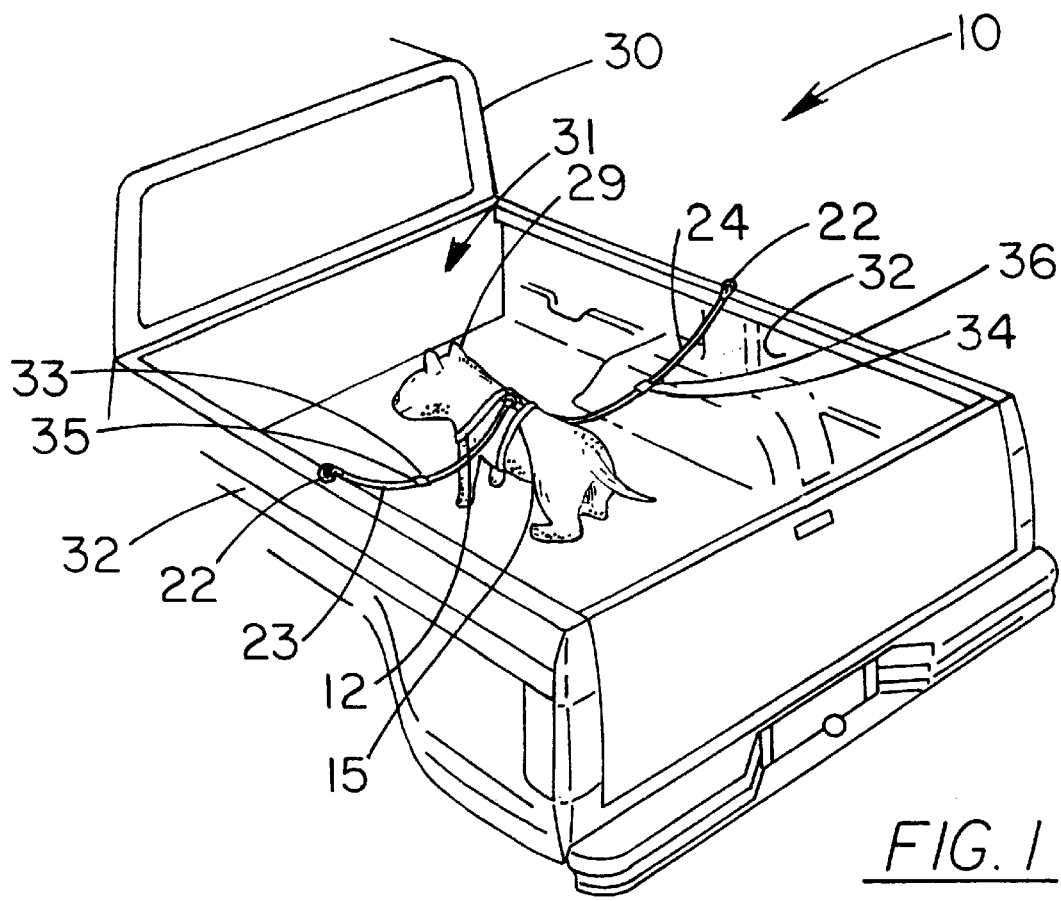
FIG. 1 is a perspective view of a new pet safety harness for a pickup truck according to the present invention.
Figure 2:
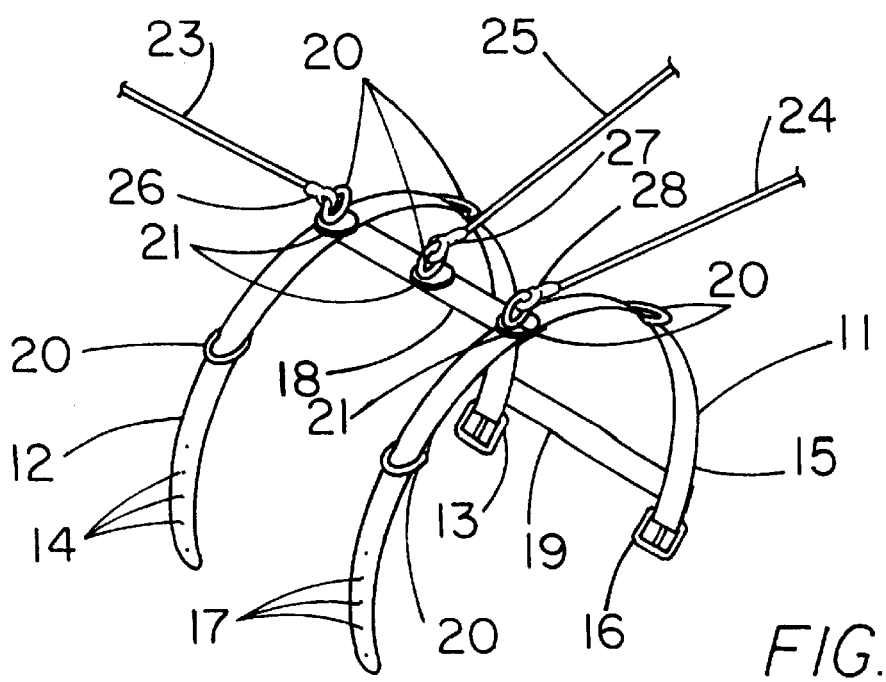
FIG. 2 is a perspective view of the harness member, first set of leash support members and leash members of the present invention.
Figure 3:
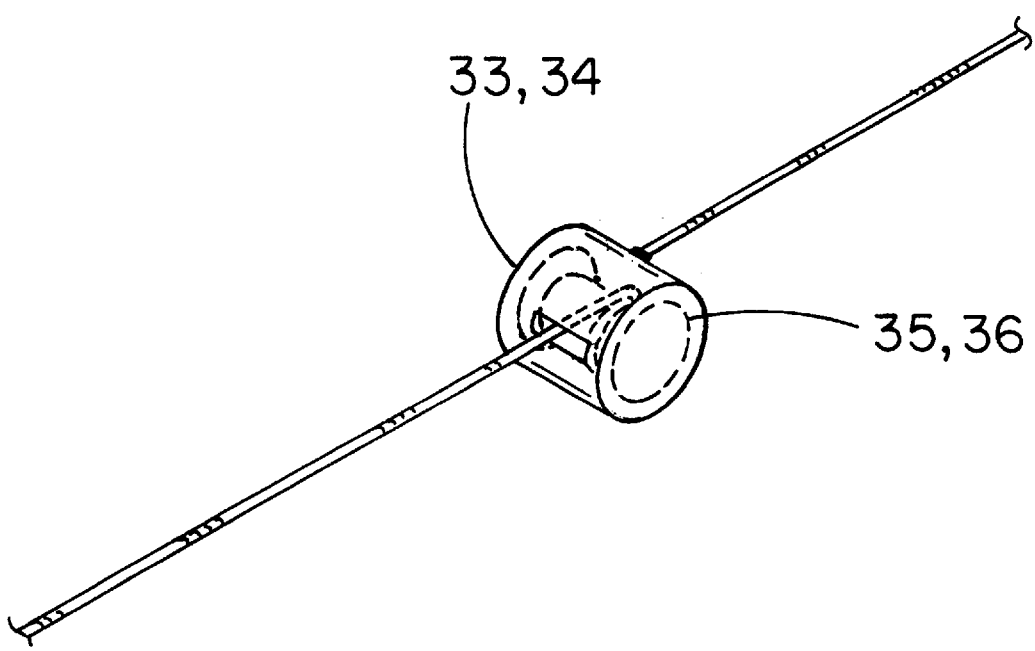
FIG. 3 is a detailed perspective view of two of the leash members showing the housings and the spring-loaded spools of the present invention.

With reference now to the drawings, and in particular to FIGS. 1 through 3 thereof, a new pet safety harness for a pickup truck embodying the principles and concepts of the present invention and generally designated by the reference numeral 10 will be described.

As best illustrated in FIGS. 1 through 3, the pet safety harness for a pickup truck 10 generally comprises a harness member 11 including a pair of strap members 12,15 each having a buckle member 13,16 securely and conventionally attached at one end thereof and each also having a plurality of holes 14,17 spaced apart and disposed therethrough at the other end of the strap member 12,15, and also includes a plurality of cross members 18,19 securely and conventionally attached to and interconnecting the strap members 12,15 with the harness member 11 being adapted to extend and securely attach about a body of a pet 29. A plurality of leash support members 20, 21,22 include a first set 20,21 of which is pivotally and conventionally attached to the harness member 11, and further include a second set 22 of which is adapted to be securely and conventionally attached to a box 31 of a pickup truck 30. The first set 20,21 of leash support members are essentially washer-like members 21 securely and conventionally attached to the harness member 11 and grommets 20 pivotally and conventionally mounted to the washer-like members 21 and about the strap members 12,15. The second set 22 of the leash support members includes grommet members 22 being adapted to be securely, removably, and conventionally attached to side walls 32 of the box 31 of the pickup truck 30. A plurality of retractable leash members 23–25 are securely and removably connected to the leash support members 20–22. Each of the leash members 23–25 includes eyelets 26–28 being securely and conventionally attached to ends of the leash members 23–25 and being connected to the leash support members 20–22. A means for retracting the leash members 23–25 such that the leash members 23–25 remain taut between the pet 29 and the box 31 of the pickup truck 30 includes a plurality of housings 33,34 and spring-loaded spools 35,36 each being rotatably and conventionally mounted to a respective one of the housings 33,34 and being adapted to carry a respective one of the leash members 23–25 thereabout.

In use, the user straps the harness member 11 about the pet 29 using the strap members 12,15 and the buckle members 13,16, and then the user connects the leash members 23–25 to the grommets 20 of the harness member 11 and puts the pet 29 in the box 31 of the pickup truck 30 and secures the other ends of the leash members 23–25 to the grommet members 22 securely mounted to the side walls 32 of the box 31 of the pickup truck 30 to prevent the pet 29 from either falling out of the box 31 of the pickup truck 30 or jumping out of the box 31 of the pickup truck 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

I claim:

1. A pet safety harness device for a pickup truck comprising:

a harness member including a pair of strap members each having a buckle member securely attached at one end thereof and each also having a plurality of holes spaced apart and disposed therethrough at the other end of said strap member, and also including a plurality of cross members securely attached to and interconnecting said strap members;

a plurality of leash support members including a first set of which is pivotally attached to said harness member, and further including a second set of which is adapted to be securely attached to a box of a pickup truck;

a plurality of retractable leash members being securely and removably connected to said leash support members; and a means for retracting said leash members such that said leash members remain taut between the pet and the box of the pickup truck.

2. A pet safety harness device for a pickup truck as described in claim 1, wherein said harness member is adapted to extend and securely attach about a body of a pet.

3. A pet safety harness device for a pickup truck as described in claim 2, wherein said first set of leash support members are essentially washer-like members securely attached to said harness member and grommets pivotally mounted to said washer-like members.

4. A pet safety harness device for a pickup truck as described in claim 3, wherein said second set of said leash support members includes grommet members being adapted to be securely and removably attached to side walls of the box of the pickup truck.

5. A pet safety harness device for a pickup truck as described in claim 4, wherein each of said leash members includes eyelets being securely attached to ends of said leash members and being connected to said leash support members.

6. A pet safety harness device for a pickup truck as described in claim 5, wherein said means for retracting said leash members includes a plurality of housings and spring-loaded spools each being rotatably mounted to a respective one of said housings and being adapted to carry a respective one of said leash members thereabout.

7. A pet safety harness device for a pickup truck comprising:

a harness member including a pair of strap members each having a buckle member securely attached at one end thereof and each also having a plurality of holes spaced apart and disposed therethrough at the other end of said strap member, and also including a plurality of cross members securely attached to and interconnecting said strap members, said harness member being adapted to extend and securely attach about a body of a pet;

a plurality of leash support members including a first set of which is pivotally attached to said harness member, and further including a second set of which is adapted to be securely attached to a box of a pickup truck, said first set of leash support members being essentially washer-like members securely attached to said harness member and grommets pivotally mounted to said washer-like members and about said strap members, said second set of said leash support members including grommet members being adapted to be securely and removably attached to side walls of the box of the pickup truck;

a plurality of retractable leash members being securely and removably connected to said leash support members, each of said leash members including eyelets being securely attached to ends of said leash members and being connected to said leash support members; and a means for retracting said leash members such that said leash members remain taut between the pet and the box of the pickup truck, said means for retracting said leash members including a plurality of housings and spring-loaded spools each being rotatably mounted to a respective one of said housings and being adapted to carry a respective one of said leash members thereabout.

* * * * *